J. T. WELLS.
FRAMING-UP DEVICE FOR MOTION PICTURE MACHINES.
APPLICATION FILED OCT. 5, 1914.
1,165,147.
Patented Dec. 21, 1915.
2 SHEETS—SHEET 1.
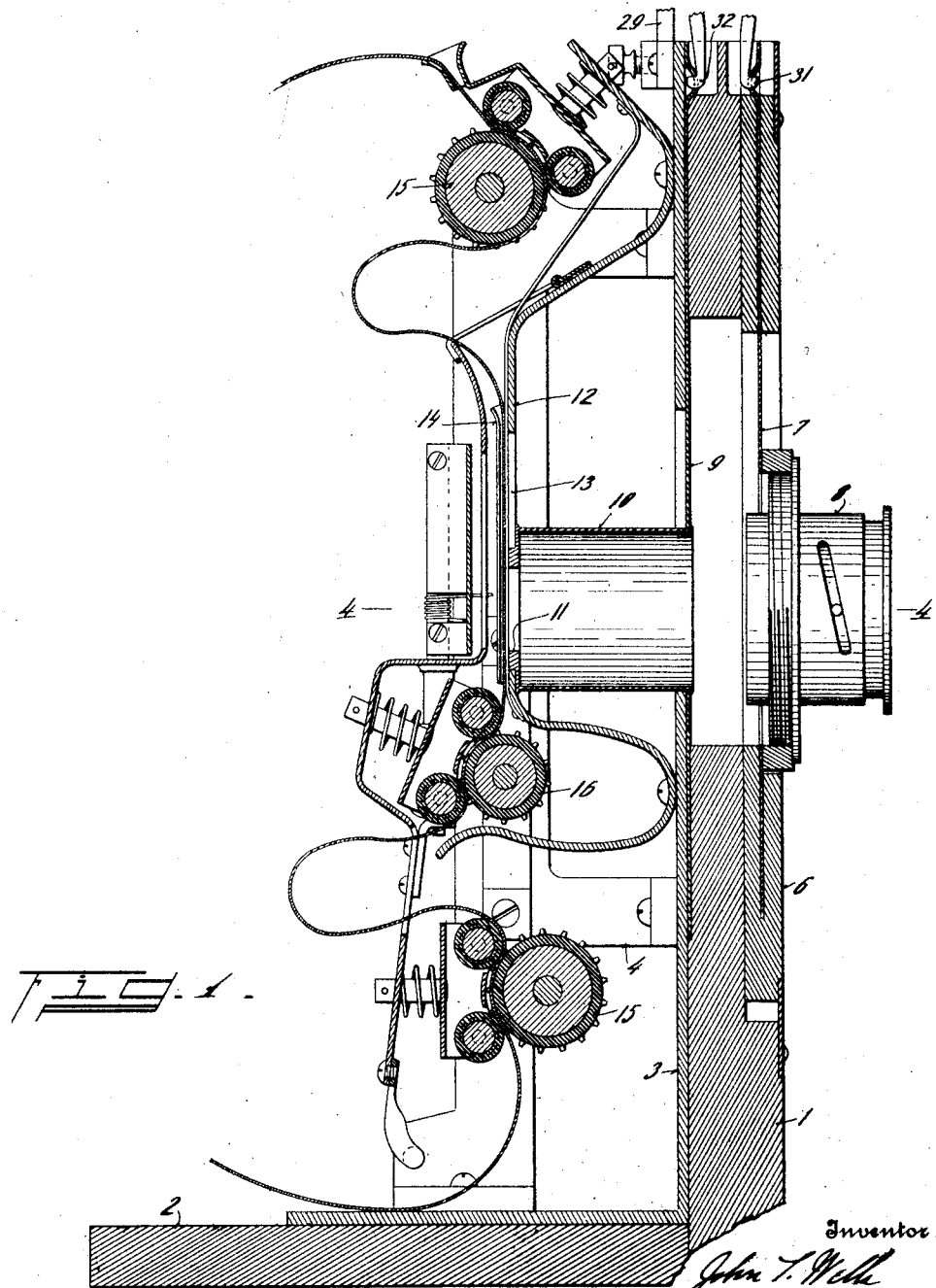

J. T. WELLS.
FRAMING-UP DEVICE FOR MOTION PICTURE MACHINES.
APPLICATION FILED OCT. 5, 1914.
1,165,147.
Patented Dec. 21, 1915.
2 SHEETS—SHEET 2.
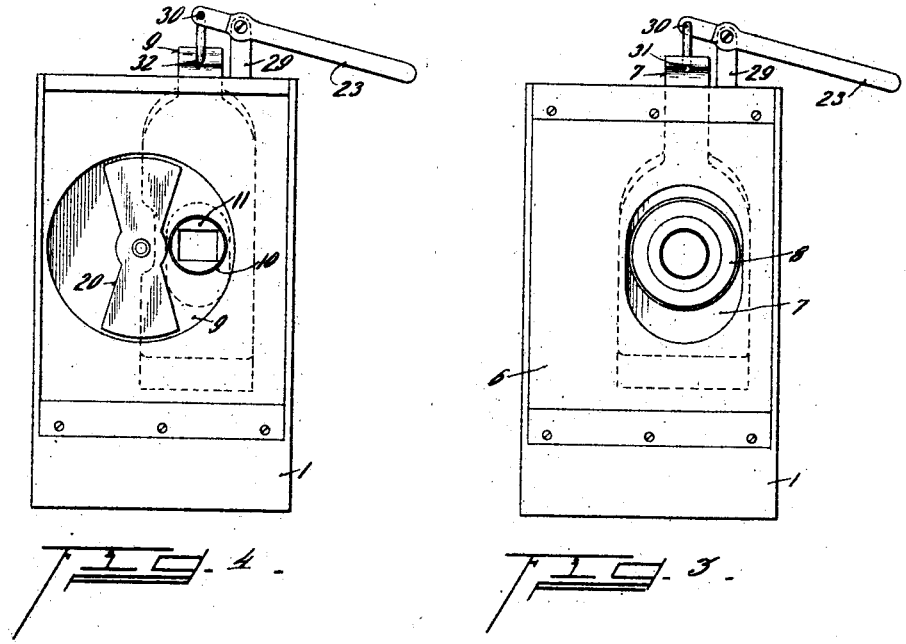
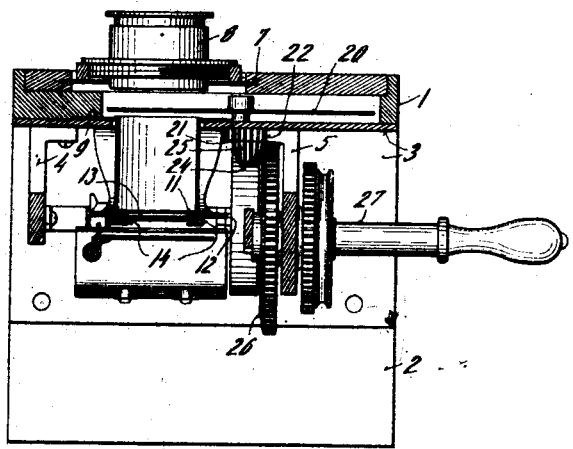

UNITED STATES PATENT OFFICE.

JOHN T. WELLS, OF NEWPORT, KENTUCKY, ASSIGNOR TO THE EDWARDS MANUFACTURING COMPANY, OF CINCINNATI, OHIO, A CORPORATION OF OHIO.

FRAMING-UP DEVICE FOR MOTION-PICTURE MACHINES.

1,165,147.  Specification of Letters Patent.  Patented Dec. 21, 1915.

Application filed October 5, 1914. Serial No. 865,130.

*To all whom it may concern:*

Be it known that I, JOHN T. WELLS, a citizen of the United States, and residing at Newport, in the county of Campbell and State of Kentucky, have invented a new and useful Improvement in Framing-Up Devices for Motion-Picture Machines, of which the following specification is a full disclosure.

My invention relates to an improvement in moving-picture machines, and more particularly to the features constituting a framing-up provision, that is, the relative adjustability of the film, focal and lens tubes, for properly spacing the film pictures one from the other in relation to the projecting area of the lens.

I have designed a machine capable of alternate use for taking, printing and projecting moving pictures, and one of the essential features enabling such a varied use, comprises a unitary lens board organization, interchangeable relative to a light-box or camera-box, and having provision for removing the lens support and framing-up the light exposure aperture for printing.

It is desirable to have a lens-board and film feed frame and guide, relatively fixed, and to provide elements adjustable on the lens-board for framing-up.

In the type of machine shown, employing an axially alined lens-tube and focal-tube carrying the film exposure aperture, it is desirable to provide means for unitarily adjusting said lens and focal tubes. To this end, I provide a lens-board formed with an aperture enlarged relative to the lens area and adjustably supporting the lens on the board within such aperture. The focal tube or other instrumentality carrying the film exposure aperture is also unitarily adjustable with the lens tube, by means of actuating mechanism on the lens-board, so that the board and film feed frame are fixed, and only the lens and film exposure aperture need be adjusted relative to these fixed members for easily and effectively framing-up the picture.

The features of my invention will be more fully set forth in the description of the accompanying drawings, forming a part of this specification, in which:—

Figure 1 is a central vertical section through my improved film and light controlling unit of a projecting machine. Fig. 2 is a plan section on line 4—4, Fig. 1. Fig. 3 is a front elevation thereof. Fig. 4 is a similar view with the lens-board removed.

The unit shown consists of a front-board 1, a base-board 2, and a lining plate 3, to which the side frames 4, 5, supporting the film feeding mechanism are secured. The lens-board 6 is detachably secured within a recess in the front-board 1, and contains a vertically adjustable lens-plate 7, supporting the lens-tube 8. A vertically adjustable focal tube-plate 9 is mounted in the front-board 1 near the lining plate 3 and carries a focal tube 10 which projects rearwardly through an elongated aperture in the lining-plate and terminates with a framing plate 11. The guide plate 12 is of elongated double S formation, having an intermediate straight portion provided with an elongated opening 13, in which the framing plate 11 is guided. The film is guided during its travel past the focal plane by channel strips 14 on either side of the opening 13.

Any form of film feeding mechanism may be employed in connection with my improved framing device, the form shown consisting of a constantly driven feed roller 15 above and below the focal plane with an intermittently driven roller 16 intermediate the focal plane and lower feed roller.

In ordinary projecting machines it is permissible to place a light shutter in front of the lens, but as it is desired, in this instance, to produce a standard film and light controlling unit capable of use in a projecting machine or picture-taking camera, this would not be practical for the reason that a light-tight joint could not be made between a rapidly moving shutter and the face of the lens-tube. For this reason, I place the light shutter 20 within the hollow front-board 1, intermediate the focal-tube and lens-tube. The shaft of this shutter is journaled in the lining plate 3 and carries a pinion 21 which meshes with the teeth 22 of a double-faced gear loosely journaled on a stud 24. The beveled teeth 25 form continuations of the teeth 22 and mesh with the beveled gear 26 secured to and rotated by the power shaft 27. When projecting it is necessary to properly frame the pictures with the framing-plate 11, by vertical adjustment thereof, also the lens-plate 7 must be simultaneously adjusted to maintain a true axial alinement of the focal-tube and lens-tube.

For adjusting both plates 7 and 9 in unison, I provide a handle 23, (see Figs. 3 and 4) pivoted on an upright 29, secured to the lining-plate 3, (see Fig. 1), said handle carries a clevis 30, having hook ends 31 and 32, the hook 31 engaging into an aperture in the upper end of the focal tube plate 9, and the hook 32 engaging into an aperture in the upper end of the lens tube plate 7.

The lens-board unit comprises the members 1, 3, 6, 7 and 9, carrying the tubes 8 and 10. The lens tube support 6 is readily detachable, enabling the focal tube 10 to be independently adjusted for framing-up incidental to printing work.

While the framing-up device is principally used in projecting pictures, it is to be noted that I desire to use the same unit for taking and printing pictures. The framing-up device is light-proof as an entirety. The lens is adjustable for framing-up in a light-proof lens or camera-board, and the focal tube is light-proof except as to light admitted through the lens. When the unit is used for taking film pictures, the camera-box incloses the lens-board, and when the lens cap is taken off, the only light to which the film is exposed is through the lens and focal tubes. Without this focal tube, or light-proof framing-up provision, the light would diverge around the film frame and touch exposed portions of the film within the camera-box. So, when the lens tube is removed for printing, the light is exposed only to the surface to be printed, as the focal tube excludes light from entering in rear of the film frame. So also in projecting pictures, the rays from the light box are all directed outwardly through the focal and lens tubes defining the picture an a. and cannot spread or diverge between the film, and the inner end of the lens tube. So a light-proof lens-board and framing-up device, are of the utmost practical value, in a unit intended for interchangeably taking, printing and projecting pictures.

Having described my invention, I claim:—

1. In a device of the class described, an apertured lens-board and film guide, a lens-tube and focal-tube axially alined and adjustably supported in relation to said apertures, the inner end of the focal-tube having a framing-plate adjacent the film guide aperture, and means for unitarily adjusting the said tubes on the lens-board.

2. In a device of the class described, an apertured lens-board and film guide, a lens-tube and focal-tube, axially alined in spaced relationship, and means rendering said tubes unitarily adjustable on the lens-board to vary their position relative to said apertures.

3. In a device of the class described, a fixed lens-board, and film guide correspondingly apertured, and a fixed frame supporting the film feed, a lens-tube, a light-proof framing-up device, and means for adjusting the same relative to said fixed members.

4. In a device of the class described, a correspondingly apertured lens-board and film guide, a lens-tube and focal-tube adjustably supported within the lens-board aperture.

5. In a device of the class described, a correspondingly apertured lens-board and film guide, a lens-tube and focal-tube axially alined and adjustably supported within the lens-board aperture, the focal tube extending from the lens-board to the film guide and having a framing-up plate adjacent the film guide aperture, and means for unitarily adjusting said tubes.

6. In a device of the class described, an apertured lens-board, a lens-tube and focal-tube axially alined and spaced within the lens-board aperture, and means for unitarily adjusting the same relative to the film.

7. In a device of the class described, a lens-board, a lens, a light-proof framing-up device, means fixedly supporting the film feed relative to the lens-board, and adjustable mechanism for the framing-up device.

8. In a device of the class described, an apertured lens-board and film guide, unitarily adjustable slides in the lens-board, and a lens-tube and focal-tube supported by said slide plates within said lens-board aperture.

9. In a device of the class described, an apertured lens-board, a film feed frame fixed relative to the board, a lens-tube, light-proof framing-up means adjustable relative to said frame and board.

10. In a device of the class described, a correspondingly apertured lens-board and film guide, a lens-tube and focal-tube axially alined and spaced within the lens-board aperture, a framing-up plate on the end of said focal-tube, said tube extending from the lens-board to the film guide aperture, a shutter operable between the ends of said tubes, and means for unitarily adjusting said tubes on the lens-board to vary their position relative to said apertures.

11. In a device of the class described, an apertured lens-board, a lens-tube and a light-proof framing device adjustable in said aperture.

12. In a device of the class described, an apertured lens-board, an axially alined lens-tube, and focal-tube having a framing-plate, the focal-tube extending from the board to the film plane, and means for unitarily adjusting said tubes within the lens-board aperture.

13. In a device of the class described, a lens-board, a lens-tube and focal-tube extending from said board to the film plane, a framing-up plate on the focal tube, and adjustable means constituting a framing-up provision.

14. In a device of the class described, a light-proof lens-board formed with an aperture enlarged relative to the lens area, and within which the lens is disposed, and means adjustable relative to said aperture constituting a light-proof framing-up device.

15. In a device of the class described, an apertured lens-board, a detachable lens support, a lens-tube and focal-tube adjustable in the aperture, and means enabling the simultaneous or independent adjustment of said tubes for framing-up work.

16. In a device of the class described, an apertured lens-board, a lens-tube and a focal-tube axially alined and spaced endwise interiorly of the lens-board, a shutter supported by the lens-board and operating intermediate the adjacent ends of said tubes, and means for unitarily adjusting said tubes in the board aperture for framing-up relative to the film.

17. In a device of the class described, an apertured lens-board, a front and rear slide adjustable in said aperture and rendering said board light proof, a lens in the front slide and a framing-up device in the rear slide.

18. In a device of the class described, an apertured lens-board, a front and rear slide adjustable in said aperture and rendering said board light proof, a lens in the front slide and a framing-up device in the rear slide, and means rendering said framing-up device light-proof except at the points of lens and film exposure.

19. In a device of the class described, an apertured lens-board, a front and rear slide adjustable in said aperture and rendering said board light proof, a lens detachably supported in the front slide, and a light-proof framing-up device supported by the rear slide.

20. In a device of the class described, a light-proof lens-board, a lens and light-proof framing-up device adjustably supported my said board, a fixed film feed frame secured to the lens-board.

21. In a device of the class described, a light-proof lens-board, a fixed film feed frame constituting a unit, a lens on said board, a light-proof device extending rearwardly from said board to the light exposure portion of the film support, and means for adjusting said lens and device for framing-up pictures.

22. A device of the class described, adaptable for taking, printing or projecting devices comprising a unitary light-proof lens-board and film frame, and a light-proof framing-up device adjustable on said unit and adapted to exclude light between the point of film exposure and the lens, except light passing in a direction axial of the lens.

In witness whereof, I hereunto subscribe my name, as attested by the two subscribing witnesses.

JOHN T. WELLS.

Witnesses:
   CLARENCE B. FOSTER,
   L. A. BECK.